United States Patent [19]

Ishiizumi et al.

[11] Patent Number: 5,490,574
[45] Date of Patent: Feb. 13, 1996

[54] HOOD HAVING INTAKE OPENINGS FOR DRAWING AIR FOR A RADIATOR AND AN ENGINE

[75] Inventors: Seiichi Ishiizumi; Yasuo Nakata; Kazuo Hirata; Akinori Nakashima, all of Sakai, Japan

[73] Assignee: Kubota Corporation, Japan

[21] Appl. No.: 319,830

[22] Filed: Oct. 7, 1994

[30] Foreign Application Priority Data

Jan. 17, 1994 [JP] Japan ................................. 6-002917

[51] Int. Cl.⁶ .................................................. B60K 11/08
[52] U.S. Cl. ........................................ 180/68.1; 180/68.6
[58] Field of Search ............................... 180/68.1, 68.4, 180/68.6, 69.21, 69.24, 68.2; 296/194

[56] References Cited

U.S. PATENT DOCUMENTS

| | | | |
|---|---|---|---|
| 1,692,342 | 11/1928 | Miller | 180/68.6 X |
| 2,549,524 | 4/1951 | Rich | 180/68.6 |
| 2,796,141 | 6/1957 | Schreiner | 180/68.6 |
| 4,662,822 | 5/1987 | Foeldesi et al. | 180/68.1 X |
| 5,036,931 | 8/1991 | Iritani | 180/68.1 |
| 5,123,695 | 6/1992 | Kanemitsu et al. | 180/68.4 X |
| 5,215,157 | 6/1993 | Teich | 180/69.24 |

FOREIGN PATENT DOCUMENTS

| | | |
|---|---|---|
| 55-53707 | 12/1980 | Japan . |
| 56-46034 | 10/1981 | Japan . |
| 0128919 | 5/1990 | Japan ........................ 180/68.1 |
| 316830 | 1/1991 | Japan . |
| 4166422 | 6/1992 | Japan ........................ 180/68.1 |

*Primary Examiner*—Brian L. Johnson
*Attorney, Agent, or Firm*—Webb Ziesenheim Bruening Logsdon Orkin & Hanson

[57] ABSTRACT

A hood for enclosing a radiator and an engine has a hood grille formed in a front surface of the hood. The hood grille includes a front wall, and right and left side walls extending from opposite sides of the front wall. The front wall defines intake openings for drawing in air for the radiator. The right and left side walls include bent portions bent substantially at right angles to the front wall. Opposite end regions thereof are secured to the right and left side walls by fixing devices. Hood grille netting extends over an entire area of the intake openings and covers at least parts of the right and left side walls. The opposite end regions of the hood grille netting are bent to correspond to the bent portions. The hood grille netting is secured to the hood grille by bolts and spacers to define spaces between the hood grille netting and the right and left side walls. These spaces communicate with the intake openings.

8 Claims, 5 Drawing Sheets

HOOD HAVING INTAKE OPENINGS FOR DRAWING AIR FOR A RADIATOR AND AN ENGINE

BACKGROUND OF THE INVENTION

1. Field of the Invention

The present invention relates to a hood for use on a vehicle for enclosing a radiator and an engine, the hood defining intake openings in a front surface thereof for drawing air to cool the radiator.

2. Description of the Related Art

A conventional hood used on a tractor or lawn mower is disclosed in Japanese Patent Publication Kokai No. 1991-16830, for example. This hood includes a grille formed in a front surface thereof. The grille has a front wall, and right and left walls extending from side edges of the front wall. The front wall defines intake openings for drawing in air for a radiator. The intake openings usually are covered by grille netting for protection from dust.

Where such dust netting is attached to cover an area of the intake openings, waste straw and the like will adhere to and clog the dust netting. Clog removing operations must be carried out frequently since such clogging could result in overheating of the engine and other troubles.

SUMMARY OF THE INVENTION

The object of the present invention is to provide a hood having little chance of dust netting becoming clogged.

The above object is fulfilled, according to the present invention, by a hood comprising a hood grille including a front wall, and right and left side walls extending from opposite sides of the front wall, the front wall defining intake openings for drawing in air for the radiator; hood grille netting extending over an entire area of the intake openings and covering at least parts of the right and left side walls; and fixing means for securing the hood grille netting to the hood grille to define spaces between the hood grille netting and the right and left side walls, the spaces communicating with the intake openings.

According to the present invention, the hood grille netting is formed wider than the intake openings. Air flows at a slower rate through this hood grille netting than through a conventional hood grille netting having substantially the same area as the intake openings. Consequently, waste straw and the like have reduced adhesion to the hood grille netting. Air entering through extensions of the hood grille netting extending beyond the intake openings collides with surfaces of the hood grille to be thereby slowed down. Thus, waste straw and the like have little chance of adhering to these extensions. In the hood according to the present invention, waste straw and the like adhere in reduced amounts to the hood grille netting, thereby allowing clog removing operations to be carried out less frequently.

In a preferred embodiment of the invention, the right and left side walls include bent portions bent substantially at right angles to the front wall, the hood grille netting having opposite end regions bent to correspond to the bent portions, the opposite end regions being secured to the right and left side walls by the fixing means. In this construction, the extensions of the hood grille netting extend from the front of the hood grille round to right and left side surfaces thereof. Air entering the extensions are drawn to the intake openings by way of passages formed around corners at the opposite sides of the hood grille. The air entering the extensions, because of the resistance of these passages, flows at a slower rate than the air entering through the front portion of the netting. Consequently, waste straw and the like have reduced adhesion to the netting in regions of these extensions.

Other features and advantages of the present invention will be apparent from the following description of an embodiment to be had with reference to the drawings.

DESCRIPTION OF THE PREFERRED EMBODIMENT

Figure 1:
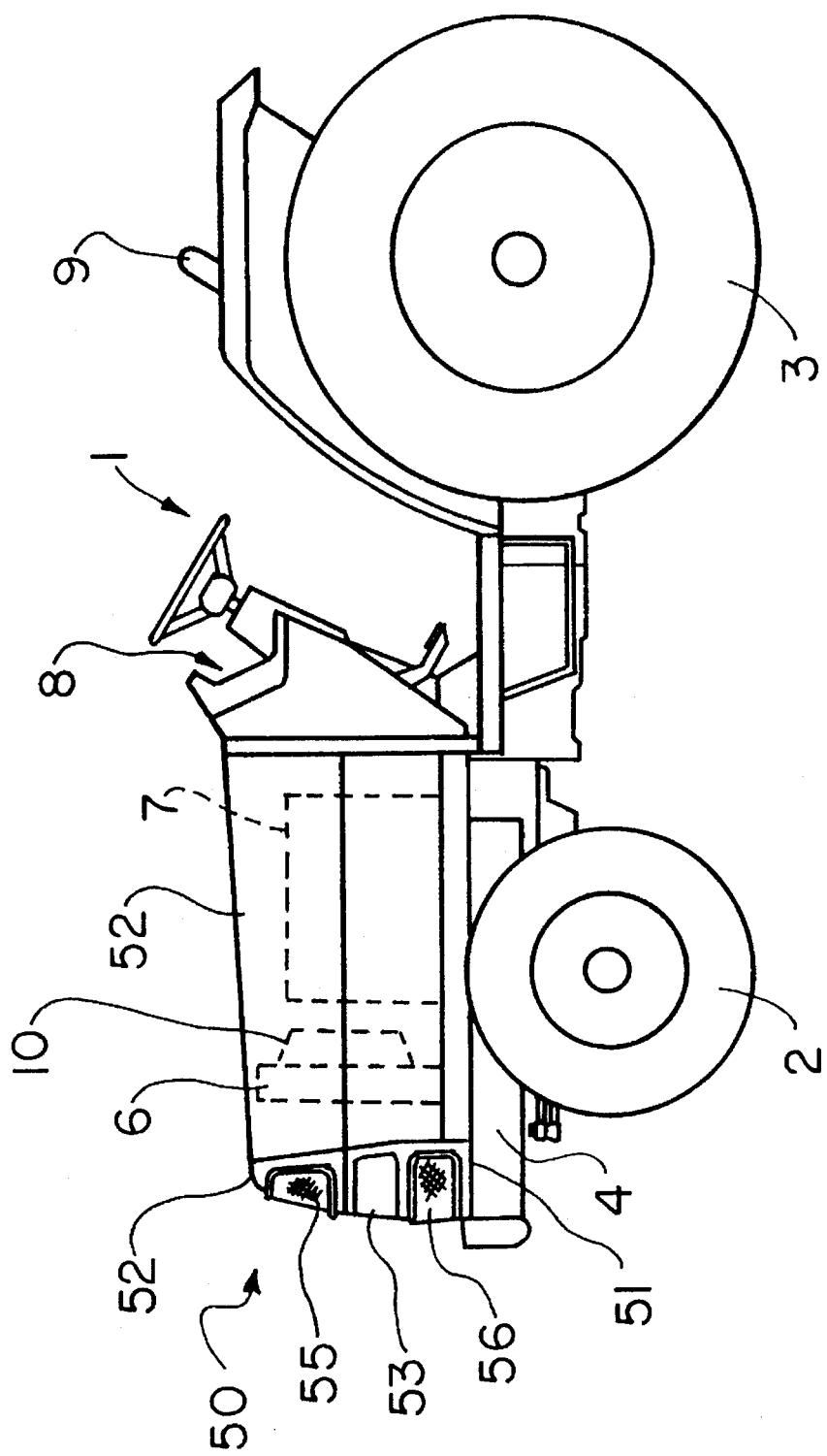
FIG. 1 is a side elevation of a tractor having a hood according to the present invention.
Figure 2:
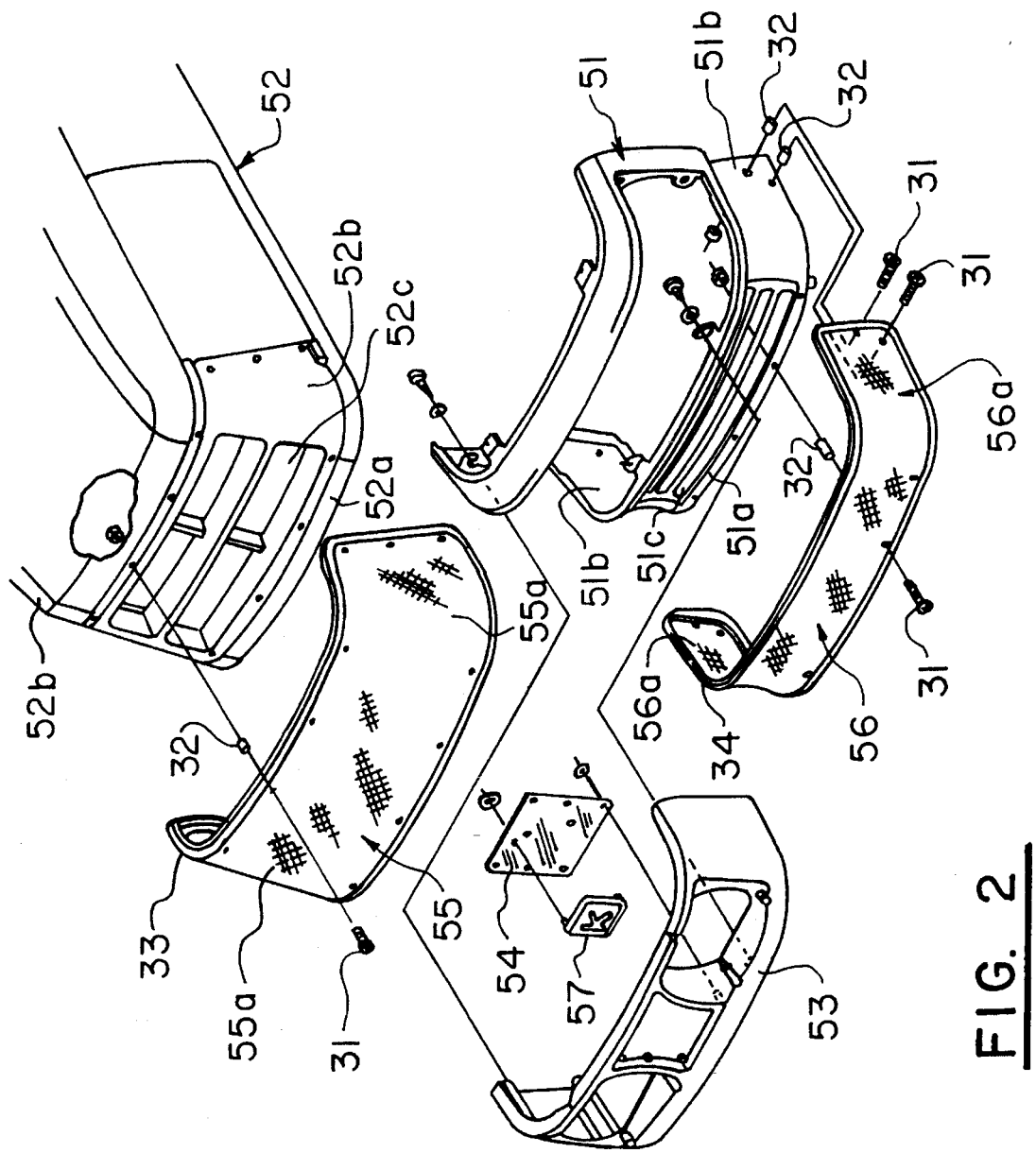
FIG. 2 is a perspective view showing an exploded view of a construction of the hood according to the present invention.
Figure 3:
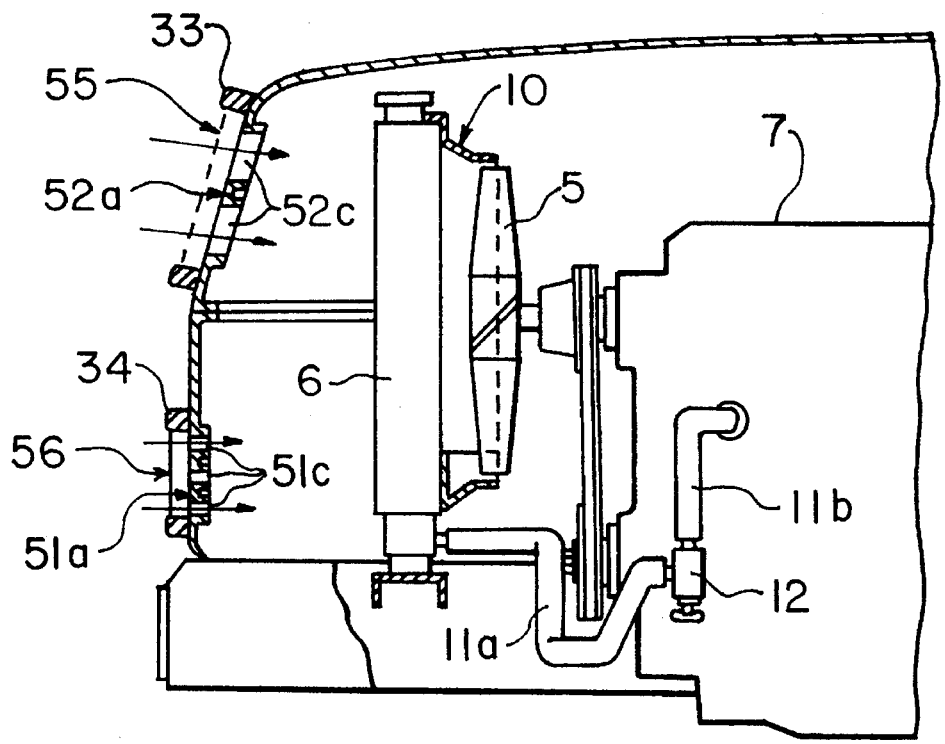
FIG. 3 is a side view in vertical section of a region of a hood grille and a front grille.

FIG. 1 shows a tractor 1 having a hood 50 according to the present invention. Front wheels 2 and rear wheels 3 support a body frame 4, and a radiator 6 with a cooling fan 5 (shown in FIGS. 3–5) and an engine 7 are arranged in a front region of the body frame 4. A control console 8 incorporating a steering column is disposed rearwardly of the engine 7. A driver's seat 9 is disposed above the rear wheels 3. As seen from FIG. 2, the hood 50 includes a front grille 51 acting as a lower hood fixed to the body frame 4, and a hood grille 52 acting as an upper hood pivotable about a transverse axis. The front grille 51 has a lighting grille 53 attached to an upper front portion thereof for supporting lighting equipment, auxiliary netting 54 and a mark plate 57. As shown in FIG. 3, the hood 50, together with control console 8 shown in FIG. 1, helps define an engine room for housing the radiator 6 with the cooling fan 5 and the engine 7.

The hood grille 52 includes a front wall 52a, and right and left side walls 52b extending from opposite sides of the front wall 52a. The front wall 52a defines intake openings 52c for drawing in air for the radiator 6. Hood grille netting 55 formed of punched metal sheet extends over an entire area of the intake openings 52c and around corners of the fight and left walls 52b bent substantially at fight angles. The hood grille netting 55 is attached to the hood grille 52 through spacers 32 and bolts 31 to define spaces between the hood grille netting 55 and the fight and left side walls 52b. These spaces communicate with the intake openings 52c. Trim 33 preferably formed of rubber is used to seal spaces between outer edges of the hood grille netting 55 and the hood grille 52.

The front grille 51 is similar in construction to the hood grille 52. The front grille 51 includes a front wall 51a, and fight and left side walls 51b extending from opposite sides of the front wall 51a. The front wall 51a defines intake openings 51c for drawing in air for the radiator 6. Front grille netting 56 formed of punched metal sheet extends over an entire area of the intake openings 51c and around corners of the right and left walls 51b bent substantially at fight angles. The front grille netting 56 is attached to the front grille 51 through spacers 32 and bolts 31 to define spaces between the front grille netting 56 and the fight and left side walls 51b. These spaces communicate with the intake openings 51c. Trim 34 preferably formed of rubber is used to seal spaces between outer edges of the front grille netting 56 and the front grille 51.

Figure 4A:
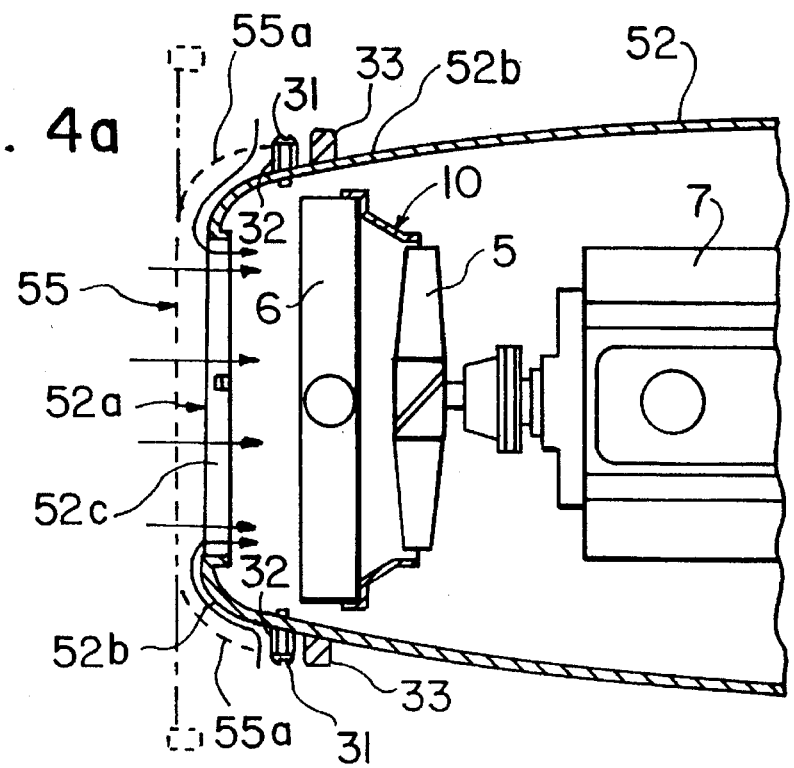
FIGS. 4a and 4b are top views in cross section of the region of the hood grille and front grille, respectively.
Figure 4B:
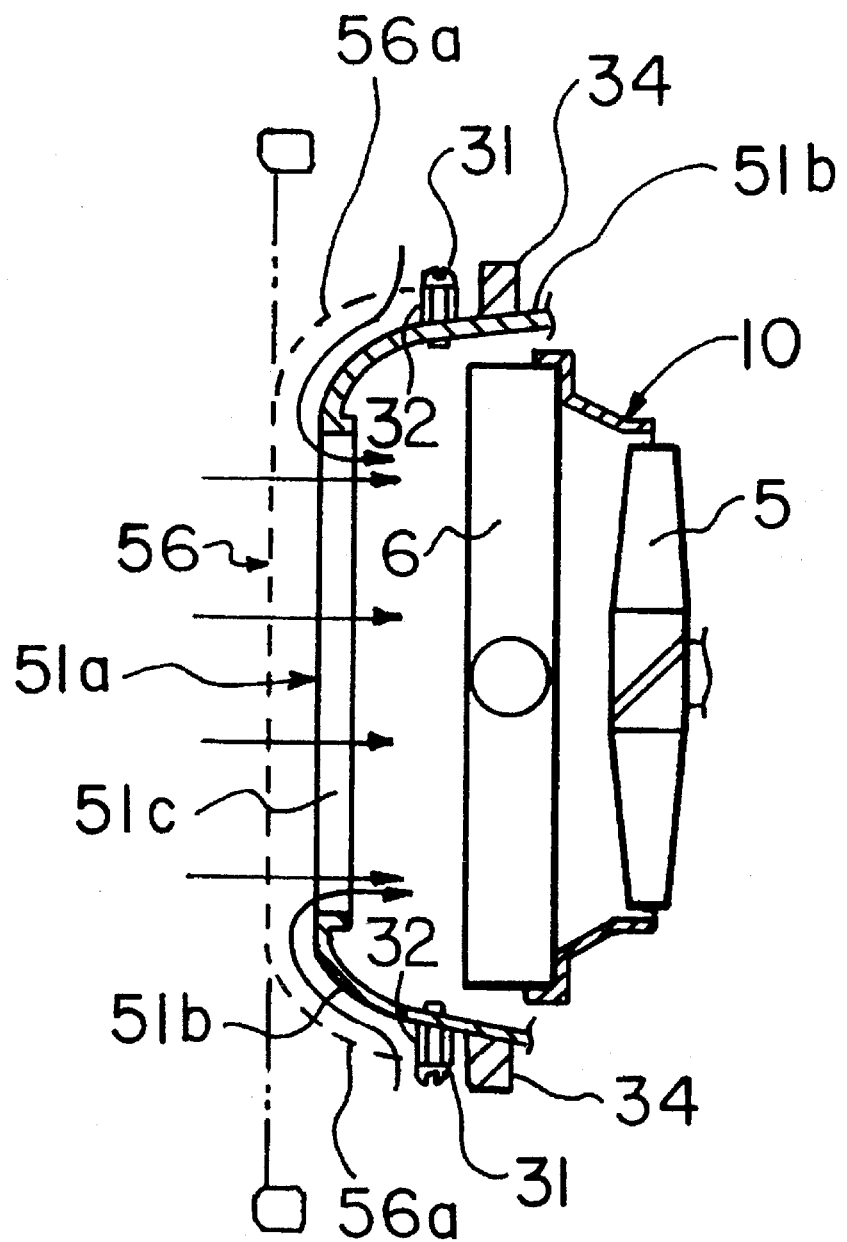

As shown in FIG. 3, cooling air is drawn by action of the cooling fan 5 of the radiator 6 through the netting 55 and the Openings 52c in the hood grille 52 and through the netting 56 and the openings 51c in the front grille 51. At this time, as shown in FIGS. 4a and 4b, air entering through extensions 55a and 56a of the hood grille netting 55 and front grille netting 56 flows into the engine room through curved passages defined between the extensions 55a and 56a and hood surfaces. Because of air resistance, these flows are far slower than the air flows entering from the front.

As shown in phantom lines in FIG. 3, the hood grille netting 55 and 56 may be formed of flat, elastic, punched metal sheet. Then, the netting 55 and 56 are bent and attached to the hood for assembly, and return to the flat shape by their elastic restoring force once the bolts are removed. Thus, the netting 55 and 56 may be stored in the flat form to save storage space.

Figure 5:
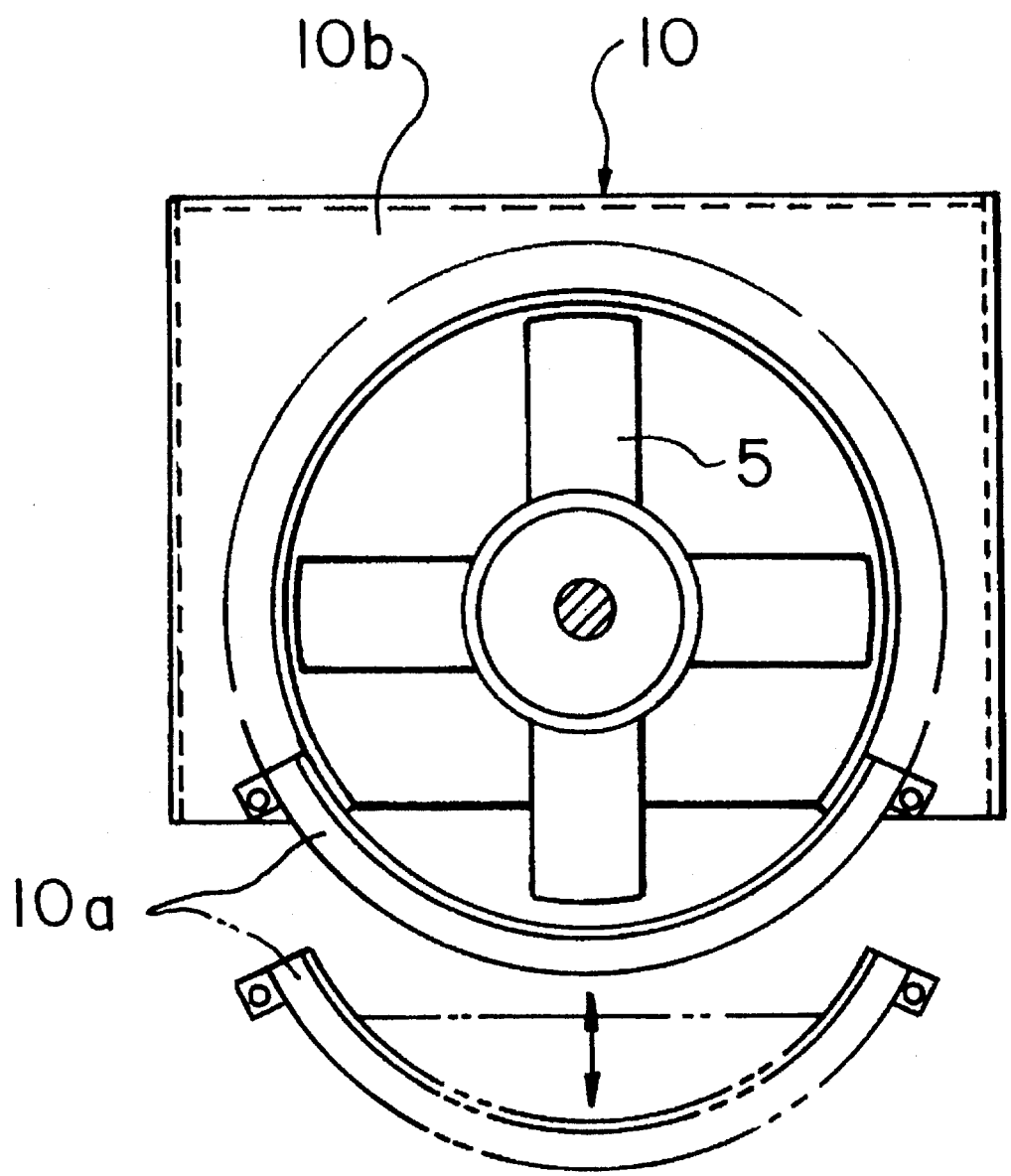
FIG. 5 is a rear view of a shroud of a radiator cooling fan.

As shown in FIG. 5, the radiator cooling fan 5 has a shroud 10 whose lower portion 10a is detachably attached to an upper portion 10b thereof. With the lower shroud portion 10a detached, waste straw and the like deposited inside the shroud 10 may be shed downward by rotation of the fan 5. This simplifies cleaning of the interior of the shroud 10.

Further, when the lower shroud portion 10a is detached, air will flow through this region to vary cooling air flows in the engine room.

In FIG. 3, numerals 11a and 11b denote pipes connected to a water jacket of the engine. Numeral 12 denotes a drain cock.

The hood grille netting 55, front grille netting 56 and auxiliary netting 54 may be formed of various types of perforated plate or network instead of punched metal sheet. Mesh size of the netting may be selected as appropriate.

What is claimed is:

1. A hood for enclosing a radiator and an engine, comprising:

a hood grille formed in a front surface of said hood, said hood grille including a front wall, and right and left side walls extending from opposite sides of said front wall, said front wall defining intake openings for drawing in air for said radiator;

hood grille netting extending over an entire area of said intake openings and extending beyond said area of said intake openings covering at least parts of said right and left side walls; and fixing means for securing said hood grille netting to said hood grille to define spaces between said hood grille netting and said right and left side walls, said spaces communicating with said intake openings.

2. A hood as defined in claim 1, wherein said right and left side walls include bent portions bent substantially at right angles to said front wall, said hood grille netting having opposite end regions bent to correspond to said bent portions, said opposite end regions being secured to said right and left side walls by said fixing means.

3. A hood as defined in claim 2, wherein said fixing means includes bolts and spacers.

4. A hood as defined in claim 3, wherein outer edges of said hood grille netting and said hood grille are sealed by trim.

5. A hood as defined in claim 4, wherein said hood grille netting and said trim are formed of elastic materials bendable for attachment to said hood grille.

6. A hood for enclosing a radiator and an engine, comprising:

a hood grille including a front wall, and right and left side walls extending from opposite sides of said front wall, said front wall defining first intake openings for drawing in air for said radiator;

hood grille netting extending over an entire area of said first intake openings and extending beyond said area of said first intake openings covering at least parts of said right and left side walls;

fixing means for securing said hood grille netting to said hood grille to define spaces between said hood grille netting and said right and left side walls, said spaces communicating with said first intake openings;

a front grille disposed below said hood grille, said front grille including a front wall, and right and left side walls extending from opposite sides of said front wall, said front wall defining second intake openings for drawing in air for said radiator;

front grille netting extending over an entire area of said second intake openings and extending beyond said area of said second intake openings covering at least parts of said right and left side walls; and fixing means for securing said front grille netting to said front grille to define spaces between said front grille netting and said right and left side walls, said spaces communicating with said second intake openings.

7. An air intake assembly for a vehicle having an engine, radiator and cooling fan housed in an engine compartment of said vehicle, said air intake assembly including:

a hood defining a portion of said engine compartment, said hood including a hood grille formed in a front surface of said hood, said hood grille including a front wall, and right and left side walls extending from opposite sides of said front wall, said front wall defining intake openings for drawing in air for said radiator, and hood grille netting extending over an entire area of said intake openings and extending beyond said area of said intake openings covering at least parts of said right and left side walls; and a shroud surrounding said cooling fan with an upper portion and a removably attached lower portion, wherein said hood further includes fixing means for securing said hood grille netting to said hood grille, whereby spaces are defined between said hood grille netting and said right and left side walls, said spaces communicating with said intake openings and at least a portion of said spaces extending beyond said area of said intake openings.

8. The assembly of claim 7, wherein said hood further includes a front grille disposed below said hood grille, said front grille including a front wall, and right and left side walls extending from opposite sides of said front wall, said front wall defining second intake openings for drawing in air for said radiator, and front grille netting extending over an entire area of said second intake openings and extending beyond said area of said second intake openings covering at least parts of said right and left side walls.

* * * * *

UNITED STATES PATENT AND TRADEMARK OFFICE
CERTIFICATE OF CORRECTION

PATENT NO.  : 5,490,574
DATED       : February 13, 1996
INVENTOR(S) : Seiichi Ishiizumi, Yasuo Nakata, Kazuo Hirata and Akinori Nakashima It is certified that error appears in the above-indentified patent and that said Letters Patent is hereby corrected as shown below:

Column 2 Line 48 "comers of the fight" should read --corners of the right--.

Column 2 Line 49 "fight" should read --right--.

Column 2 Line 52 "fight" should read --right--.

Column 2 Line 59 "fight" should read --right--.

Column 2 Line 63 "comers" should read --corners--.

Column 2 Line 64 "fight" should read --right--.

Column 2 Line 67 "fight" should read --right--.

Column 3 Line 7 "Openings" should read --openings--.

Signed and Sealed this

Twenty-first Day of May, 1996

Attest:

BRUCE LEHMAN

*Attesting Officer*   Commissioner of Patents and Trademarks